United States Patent [19]

Lucchesi et al.

[11] Patent Number: 4,486,377
[45] Date of Patent: Dec. 4, 1984

[54] PROCESS FOR REDUCING DRAW RESONANCE IN POLYMERIC FILM

[75] Inventors: Peter J. Lucchesi, Middlesex; Stuart J. Kurtz, Martinsville; Ernest H. Roberts, Somerset, all of N.J.

[73] Assignee: Union Carbide Corporation, Danbury, Conn.

[21] Appl. No.: 424,642

[22] Filed: Sep. 27, 1982

[51] Int. Cl.³ .............................................. D01D 5/12
[52] U.S. Cl. ................................ 264/510; 264/556; 264/171; 264/210.2; 264/210.3; 264/212; 264/216; 264/237; 264/284; 425/72 R; 425/224; 425/385
[58] Field of Search .................. 264/237, 210.2, 210.5, 264/212, 216, 284, 348, 210.3, 510, 556, 171; 425/71, 72 R, 224, 385, 326.1, 325

[56] References Cited

U.S. PATENT DOCUMENTS

| | | | |
|---|---|---|---|
| 3,159,696 | 12/1964 | Hobgson, Jr. | 264/216 |
| 3,161,560 | 12/1964 | Paquin et al. | 264/212 |
| 3,238,284 | 3/1966 | Sutton | 264/216 |
| 3,374,303 | 3/1968 | Metz, Jr. | 264/284 |
| 3,549,360 | 12/1970 | O'Neill et al. | 264/210.2 |
| 3,597,515 | 8/1971 | Widiger | 264/556 |
| 3,847,516 | 11/1974 | Hoffman | 425/72 R |
| 3,894,904 | 7/1975 | Cook | 264/210.2 |
| 3,904,725 | 9/1975 | Husky et al. | 264/556 |
| 4,017,575 | 4/1977 | Heyer | 425/224 |
| 4,033,709 | 7/1977 | Kroyer | 425/224 |
| 4,066,729 | 1/1978 | Van Cappellen | 425/379 R |
| 4,148,851 | 4/1979 | Tani et al. | 264/216 |
| 4,255,365 | 3/1981 | Heyer | 264/216 |
| 4,319,868 | 3/1982 | Riemersma et al. | 425/385 |
| 4,352,771 | 10/1982 | Szabo | 264/210.2 |

FOREIGN PATENT DOCUMENTS

| | | | |
|---|---|---|---|
| 754984 | 3/1967 | Canada | 264/556 |
| 25509 | 11/1970 | Japan | 264/216 |

OTHER PUBLICATIONS

Aird, G. P. and Yeow, Y. L., "Stability of Film Casting of Power-Law Liquids" Ind. Eng. Chem. Fundam., pp. 7-10 1983.

C. B. Weinberger, G. F. Cruz-Saenz & G. J. Donnelly, "Onset of Draw Resonance During Isothermal Melt Spinning: A Comparison Between Measurements and Predictions", AICHE Journal, May 1976, (vol. 22, No. 3) pp. 441-448.

R. J. Fisher and M. M. Ornn, "Mechanics of Nonisothermal Polymer Melt Spinning", AICHE Journal (vol. 23, No. 1) pp. 23-28.

S. Kase and M. Araki, "Studies on Melt Spinning. VIII, Transfer Function Approach" Journal of Applied Polymer Science, vol. 27, pp. 4439-4465 (1982).

Primary Examiner—Jeffery Thurlow
Assistant Examiner—Patrick Dailey
Attorney, Agent, or Firm—Clement J. Vicari

[57] ABSTRACT

A process for producing polymeric film substantially free of draw resonance under conditions and at rates which would otherwise cause draw resonance in polymeric film susceptible to draw resonance wherein a fluid medium is directed against the moving film at a location between the extrusion die and the film take-up zone.

34 Claims, 5 Drawing Figures

PROCESS FOR REDUCING DRAW RESONANCE IN POLYMERIC FILM

BACKGROUND OF THE INVENTION

1. Field of Invention

This invention relates to an improvement in a process for reducing draw-resonance in polymeric film. In another aspect, the invention relates to a process for extrusion coating of a substrate or article. In still another aspect, the invention relates to a process for embossing a polymeric film.

2. Definitions

By draw-down is meant the stretching of an extruded web or film in the direction of flow and sometimes also in the transverse direction.

By "draw ratio" is meant the film or coating velocity after the rapid cooling zone or station divided by the extrudate velocity emerging from a die. This can be approximated by using the inverse of thicknesses which can be expressed as $$R = \left(\frac{1}{t_f}\right) / \left(\frac{1}{t_o}\right)$$

wherein $t_f$ is the thickness of film or coating;
$t_o$ is the thickness of film extrudate in the die
R is the draw ratio.

By "draw resonance" or surging is meant sustained random and/or periodic variations in the molten film occurring between the die and the rapid cooling zone. It occurs when the draw ratio exceeds a critical value. Draw resonance or surging can be thought of as an instability phenomenon manifested during the drawing down of a material coming from an extruder, more or less homogeneously. The instability manifests itself in the occurrence of sustained random and/or periodic fluctuations in the extruded web (film) dimensions such as film thickness when a critical value of tne draw ratio is exceeded. Surging may be so extreme as to actually break a web or film that extrudes from a die and totally shuts down an extrusion coating or film process.

3. Description of the Prior Art

Certain polymeric resins and particularly polyolefin resins are not entirely satisfactory for commercial operations involving melt embossing and/or extrusion coating applications. This has been primarily attributed to tne phenomenon of draw resonance.

Normally, the onset of draw resonance with certain polymeric resins requires two fixed points; an extrusion die and a rapid cooling zone and both are present in extrusion coating and embossing processes. Draw resonance for certain resins occurs at characteristic draw ratios, often in the range of 20 to 1. In both melt embossing and extrusion coating applications, draw resonance can occur with certain resins because die gaps are usually 20-40 mils and the thickness of tne drawn down final film or coating is usually equal to or less than 1 mil. Thus, the draw ratio may be in excess of the critical draw ratio of certain resins.

One possible method for reducing draw resonance is to lower the draw ratio which is approximately equal to the ratio of the die gap to the film or coating thickness. However, at the high takeoff speeds (equal to or greater than 500 FPM) and thin gauges (equal to or less than 1 mil) encountered in tnese processes, it is not commercially feasible to reduce the die gap, thereby lowering the draw ratio, because of constraints of head pressure and melt fracture. It has presently been proposed to overcome draw resonance with difficult processing polymeric materials particularly polyolefins such as linear low density polyolefins (LLDPE), nigh density polyolefins (HDPE) and polypropylene by using mixtures of these polymeric materials with easier processing resins such as disclosed in U.S. Pat. No. 4,339,507. Unfortunately, however, in addition to higher raw material costs, the final product does not have the inherent property advantages achieveo by using the LLDPE, HDPE, or polypropylene alone.

SUMMARY OF THE INVENTION

A process for reducing draw resonance of a polymeric molten film susceptible to draw resonance under conditions which would cause draw resonance by extruding the film from a die and rapidly cooling said film in a rapid cooling zone, which comprises directing a fluid medium against said molten film between said die and said rapid cooling zone, saic fluid medium being directed against said molten film at a velocity and in an amount sufficient to reduce draw resonance in said molten film.

In another aspect of the invention, the molten film treated according to the present invention is utilized as the coating or laminating material in an extrusion coating or laminating process.

In a still further aspect of the invention, the molten film treated according to the present invention is subjected to an embossing operation to produce an embossed film substantially free of the effects of draw resonance.

DESCRIPTION OF THE PREFERRED EMBODIMENTS

Figure 1:
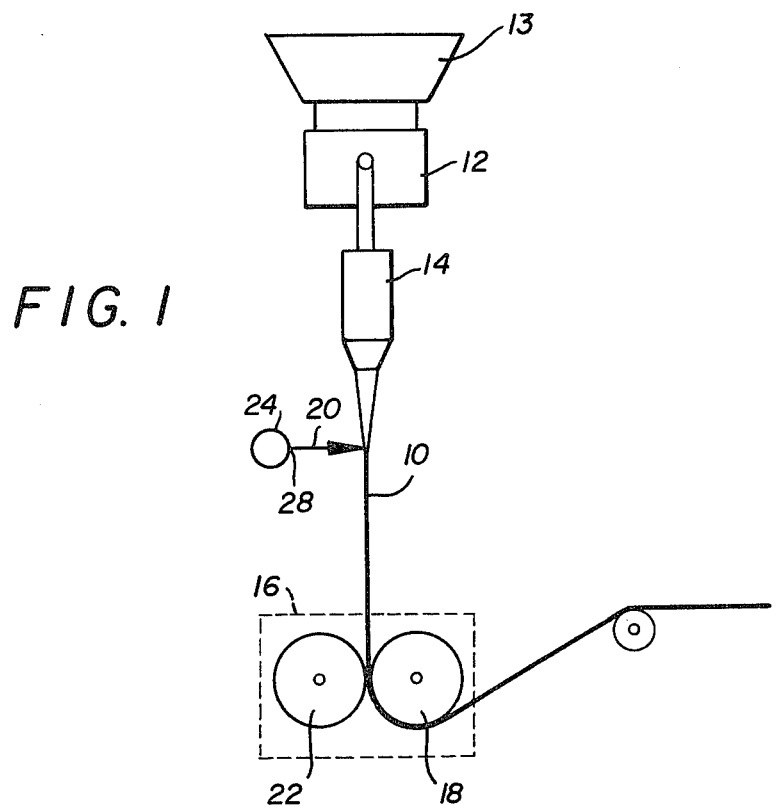
FIG. 1 is a schematic representation of the process of the invention showing an extruder, a die, a molten film exiting the die, a rapid cooling zone or station and a fluid medium device disposed between the die and rapid cooling station.

For purposes of ease of description only, the present invention will be described herein by reference to linear, low density ethylene hydrocarbon copolymers. It is not the intention to thereby limit the invention. As described more fully hereinbelow, the invention is generally applicable to polymeric resins such as polypropylene, high density polyethylene, and certain high pressure low density polyethylene (HPLDPE) which have a tendency to draw resonate under certain operating conditions, between an extrusion die and a rapid cooling station in extrusion coating and/or embossing processes.

Linear, low density ethylene hydrocarbon copolymers (LLDPE) heretofore have not been satisfactorily used commercially as extrusion coating compositions. Extrusion coating resins are thought to have certain characteristics. For example, in general, the highest coating speeds have been obtained with extrusion coating resins having the lowest melt strength. See Kaltenbacher et al., "The Use of Melt Strength in Predicting the Processability of Polyethylene Extrusion Coating Resins", 50 TAPPI 20-26 (Jan. 1967). Linear, low density ethylene hydrocarbon copolymers are thought to possess low melt strength which would lead one skilled in the art to believe that they would provide good extrusion coating compositions.

However, applicants have found that there are deficiencies associated with the use of certain polymeric resins such as unmodified, linear, low density ethylene hydrocarbon copolymer resins as extrusion coating compositions. Process deficiencies include draw resonance which can lead to melt breakage.

In an extrusion coating or embossing process, the most significant deficiency in the use of unmodified, linear, low density ethylene hydrocarbon copolymer is that of draw resonance. Draw resonance, in these cases, occurred at draw ratios that were exceptionally low, i.e., the amount of drawdown that could be done was not adequate for proper fabrication. When unmodified, linear, low density ethylene hydrocarbon copolymer was used for extrusion coating, maximum stable draw ratios were found to be less than 10 to 1. In most commercial extrusion coating operations, draw ratios greater than 20 to 1 are sought.

LOW DENSITY POLYETHYLENE: RHEOLOGY

The rheology of polymeric materials depends to a large extent on molecular weight and molecular weight distribution. Studies of high pressure low density polyethylene have also shown tne importance of long chain branching. In extrusion coating, two aspects of rheological behavior are important: shear and extension. Within a film extruder and extrusion die, a polymeric melt undergoes severe shearing deformation. As the extrusion screw pumps the melt to and through an extrusion coating die, the melt experiences a wide range of shear rates. Most film extrusion processes are thought to expose the melt to shear at rates in the 50-2000 sec.$^{-1}$ range.

Polymeric melts are known to exhibit what is commonly termed shear thinning behavior, i.e., non-Newtonian flow behavior. As shear rate is increased, viscosity (the ratio of shear stress, $\tau$ to shear rate, $\gamma$) decreases. The degree of viscosity decrease depends upon the molecular weight, its distribution and molecular configuration, i.e., long chain branching of the polymeric material. Snort chain branching has little effect on shear viscosity. In general, broad molecular weight distribution resins show enhanced shear thinning behavior in the shear rate range common to extrusion in extrusion coating. Long chain branching can also enhance this behavior. Narrow molecular weight distribution resins exhibit reduced shear thinning behavior at extrusion shear rates.

The consequences of the aforementioned differences in the effect of molecular structure on shear thinning are that narrow distribution resins (such as linear, low pressure, ethylene hydrocarbon copolymers) require higher power and develop higher pressures during extrusion than broad molecular weight distribution resins (such as high pressure, low density polyethylenes) of equivalent melt index (ASTM D-1238). In order to compensate for high die pressures, it is often necessary to run with relatively large die gap openings, e.g., greater than 20 mils. Sucn die gap openings require a high drawdown, usually greater than 20 to 1.

The rheology of polymeric materials is customarily studied in shear deformation. In shear, the velocity gradient of tne deforming resin is perpendicular to the flow direction. This mode of deformation is experimentally convenient but does not convey the essential information for understanding material response in extrusion coating processes. As one can define a shear viscosity in terms of shear stress and shear rate, i.e.,:

$$\eta_{shear} = \tau_{12}/\gamma \qquad (1)$$

where
$\eta_{shear}$ = shear viscosity (poise)
$\tau_{12}$ = shear stress (dynes/cm$^2$)
$\gamma$ = shear rate (sec$^{-1}$)

an extensional viscosity can be defined in terms of normal stress and strain rate, i.e.:

$$\eta_{ext} = \pi/\epsilon \qquad (2)$$

$\eta_{ext}$ = extensional viscosity (poise)
$\pi$ = normal stress (dynes/cm$^2$)
$\epsilon$ = strain rate (sec$^{-1}$)

In pure extensional flow, unlike shear flow, the velocity gradient is parallel to the flow direction. Commercial extrusion processes involve both shear and extensional deformations. In extrusion coating, as well as in film extrusion (tubular blown and slot cast) the extensional rheology characteristics of a resin are exceedingly important. They may, in fact, dominate the process.

Extensional viscosity can be measured by a number of experimental techniques (see, for example, J. M. Dealy, Rheometers for Molten Plastics, Van Nostrand, Reinhold Company, New York, 1982). The procedure used herein is a constant strain rate method. Briefly, the method uses a servo-controlled Instron tensile testing machine. The ends of a molten ring of polymer, immersed in a silicone oil bath, are separated at an accelerating rate according to the following relationship.

$$L(t) = L_0 \exp(\dot\epsilon t) \text{ where} \qquad (3)$$
$L(t)$ = jaw separation at time $t$ (cm)
$L_o$ = initial jaw separation (cm)

$\dot\epsilon$ = strain rate (sec$^{-1}$), a constant
$t$ = time (sec).

A force transducer measures load during the deformation. Extensional viscosity is calculated by dividing stress by strain rate and is determined as a function of displacement or time during the deformation at a constant temperature of 150° C.

When certain high pressure, low density polyethylene melts such as extrusion coating grades are deformed according to equation (3), extensional viscosity is observed to increase at an accelerating rate with log time. Tne melt is said to strain harden. This strain hardening intensifies as the strain rate is increased. In some cases, the melt appears to exhibit unbounded stress growth.

Transition metal catalyzed, ethylene hydrocarbon copolymers do not, in general, show accelerating stress growth. Certain broad molecular weight distribution resins do strain harden, but their extensional viscosity ($\log \eta_{ext}$) seems to increase linearly with log time. Certain narrow molecular weight distribution resins, such as those which are herein described, show little strain hardening when strain rates are low.

High pressure, low density polyethylene can be considered "soft" in shear and "stiff" in extension when compared to linear ethylene hydrocarbon copolymers of narrow molecular weight distribution. Ethylene hydrocarbon copolymers having a narrow molecular weight distribution exhibit the opposite rheology. They are "stiff" in shear and "soft" in extension. The terms "soft" and "stiff", as used herein, refer to the relative magnitude of shear and extensional viscosity when comparing the rheology of high pressure, low density polyethylene and linear ethylene hydrocarbon copolymers of narrow molecular weight distribution.

The consequences of the differences in strain hardening in the extensional viscosity characteristics are as follows. Certain high pressure, low density polyethylene resins tend to build up stress at high extrusion coating rates and drawdown in an extrusion coating process. When these "high pressure" resins reach a point where the stress exceeds the melt strength, the resins break or rupture. In contrast to the behavior of these high pressure, low density polyethylene resins, low pressure, low density ethylene hydrocarbon copolymer resins can be drawn down considerably without reaching stresses to cause melt breakage. On the other hand, by not building up significant stresses with drawing, it is believed that a low pressure, low density polyethylene melt becomes more susceptible to draw resonance.

LINEAR, LOW DENSITY ETHYLENE HYDROCARBON COPOLYMERS

Suitable linear, low density ethylene hydrocarbon copolymers for the extrusion coating compositions of the present invention are those copolymers of ethylene and one or more $C_3$ to $C_8$ alpha olefins having a density of about equal to or greater than 0.87 to equal to or less than 0.940 and preferably of about equal to or greater than 0.916 to equal to or less than 0.928. These copolymers can be made in a solution, slurry or gas phase process well known to those skilled in the art.

Also, suitable linear, low density ethylene hydrocarbon copolymers of this invention are those having a major mole percent of equal to or greater than 80 of ethylene and a minor mole percent (of equal to or less than 20) of one or more $C_3$ to $C_8$ alpha olefins. The $C_3$ to $C_8$ alpha olefins include propylene, butene-1, pentene-1, heptene-1, 4-methyl pentene-1, hexene-1, and octene-1.

Linear, low density ethylene hydrocarbon copolymers of the present invention normally have a standard melt index of equal to or greater than 0.5, preferably equal to or greater than 1.0 and most preferably equal to or greater than 2.0. Also, copolymers of this invention should have a standard melt index of equal to or less than 100, preferably equal to or less than 50, and most preferably equal to or less than 20.

Preferred linear, low density ethylene hydrocarbon copolymers for use in the extrusion coating compositions of the present invention are those possessing a molecular weight distribution, Mw/Mn, of equal to or greater than 2.4 to equal to or less than 5.0 and preferably of about equal to or greater than 2.8 to equal to or less than 3.4. These copolymers have a melt flow ratio of about equal to or greater than 20 to equal to or less than 37 and preferably, equal to or greater than 25 to equal to or less than 32. The melt flow ratio of equal to or greater than 20 to equal to or less than 32 thus corresponds to a Mw/Mn value range of about 2.4 to 3.3 and the melt flow ratio range of equal to or greater than 25 to equal to or less than 37 corresponds to a Mw/Mn range of about 2.8 to 3.6.

The melt flow ratio equals the Flow Rate (ASTM 1238, Condition F) divided by the Melt Index (ASTM D1238 Condition E).

These ethylene hydrocarbon copolymers also have a total unsaturation content of about equal to or greater than 0.1 to equal to or less than 0.3 C=C per 1000 carbon atoms and preferably of about equal to or greater than 0.14 to equal to or less than 0.24 C=C per 1000 carbon atoms.

Preferred linear, low density ethylene copolymers for use in the present invention include those which may be produced in accordance with the procedures set forth in U.S. Pat. No. 4,302,566 in the names of F. J. Karol et al. and entitled "Preparation of Ethylene Copolymers in Fluid Bed Reactor", and the procedures set forth in U.S. Pat. No. 4,302,565 in the names of G. L. Goeke et al. and entitled "Impregnated Polymerization Catalyst, Process for Preparing, and Use for Ethylene Copolymerization" as well as procedures which will produce ethylene hydrocarbon copolymers with properties as heretofore described..

Other linear, low density ethylene hydrocarbon copolymers preferred for use in the present invention are those which can be prepared as described in U.S. Pat. No. 4,011,382, entitled "Preparation of Low and Medium Density Ethylene Polymer in Fluid Bed Reactor" by I. J. Levine et al., the disclosure of which is incorporated herein by reference.

EXTRUSION COATING COMPOSITIONS

The extrusion coating compositions of the present invention may be used in any of the forms of such compositions which are commonly employed in the extrusion coatings art. Extrusion coating compositions of this invention optionally may contain between 100 and 1000 ppm of various chill roll release agents such as low molecular weight polyethylene glycol and fatty acid amides; between 1 and 15% by weight, respectively, of fillers and pigments such as carbon black, titanium dioxide, clays, diatomaceous earth, calcium carbonate and the like; between 20 and 150 ppm of antioxidants, such as butylated hydroxytoluene and hindered phenols, and the like.

EXTRUSION COATING CONDITIONS

The resins of this invention as described herein, can be extruded directly on a variety of substrates to form composite sheets or articles by methods which are well known in the art. The substrates include materials such as polyethylene, paper, aluminum foil, etc. The coating equipment may include a single extrusion line as shown typically in FIG. 3 or more than one extrusion line in order to apply multiple layers of substrates together.

Extrusion can be accomplished via a screw-type extruder which comprises a plastic material feed section, one or more screws enclosed in an extruder barrel, a mixing section at the end of the one or more screws, and a forming die beyond the mixing section. In such an extrusion apparatus, the polymer in a dry, granular or pellet form is fed from a hopper to the feed section of the extruder and forwarded by rotation of the screws, passes through the extruder barrel wherein it is heated and mechanically worked to melt the polymer before it emerges from the forming die as a web.

Figure 3:
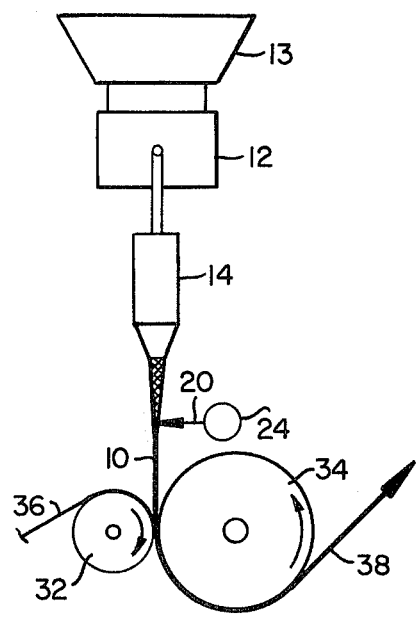
FIG. 3 is a schematic representation of a typical basic extrusion coating process showing the fluid medium device disposed between the die and the rapid cooling zone e.g. a chill roll water bath and pressure roll and showing the molten film being coated onto a substrate.

In a basic typical extrusion coating operation, as shown in FIG. 3, the LLDPE is fed into a extruder hopper. By gravity feed, the LLDPE goes into a standard polyethylene screw (not shown) in an extrusion coating extruder. The polymer enters the feed section as a solid and is conveyed, compressed and begins melting in the transition section of the screw extruder. It then proceeds with the melting and pumping into a so-called metering section of the screw, at which point temperature also increases, possibly assisted by heat transfer to the melt on the barrel side. The melt then flows through the extruder, optionally past a mixing head (not shown) to eliminate any unmelted material and to homogenize the melted material, optionally also followed by another metering section which will increase the pumping to a pressure necessary to extrude through the die. The melt is more or less homogeneous in temperature and uniformity as it passes through and out of the die forming a molten film. This web then is drawn down and coated onto a substrate. Thus, as shown in FIG. 3, the substrate is directed by tne pressure roll in contact with the molten film and the molten film is coated onto the substrate by the compressing action between the pressure roll and the chill roll. The web is cooled by the chill roll and rubber roll (back-up) forming a nip and drawn off with the substrate onto other take-up rolls. It then proceeds through various treatment stations to a wind-up system where the coated substrate can then be wound up.

In the extruder, the resin is subjected to temperatures ranging from about 50° F. above ambient up to 650° F. The extrudate emerges at temperatures from 275° F. to 650° F., preferably from 375° F. to 630° F., under varying conditions of head pressure. Average residence times in the extruder can vary from about 0.5 to 15 minutes. The extrusion coating is usually formed in a uniform thickness of from about 0.1 to 10 mils thick.

EMBOSSING CONDITIONS

Figure 4:
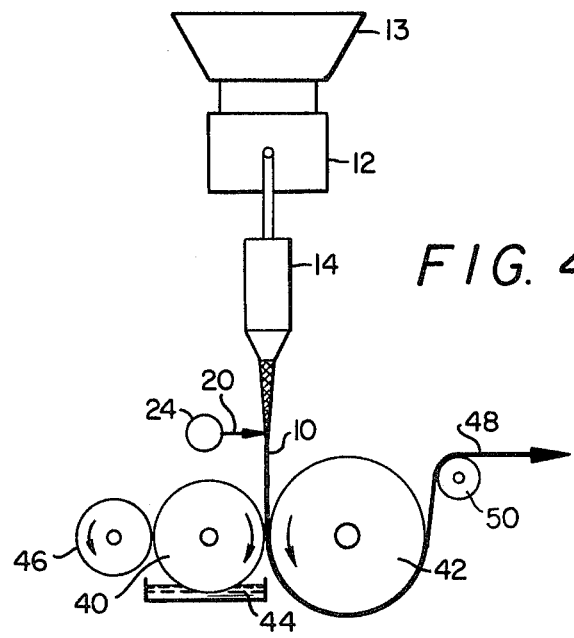
FIG. 4 is a schematic representation of a typical basic embossing process showing the fluid medium device disposed between the die and the rapid cooling zone which includes an embossing roll, a nip roll, a wiper roll and a water bath.

In a typical basic melt embossing operation such as shown in FIG. 4, the LLDPE is fed into an extruder hopper. By gravity feed, the LLDPE goes into a polyethylene screw (not shown) in an extruder. The polymer enters the feed section as a solid and is conveyed, compressed and begins melting in the transition section of the screw extruder. It then proceeds with the melting and pumping into a so-called metering section of the screw, at which point temperature also increases, possibly assisted by heat transfer to the melt on the barrel side. The melt then flows through the extruder, optionally past a mixing head (not shown) to eliminate any unmelted material and to homogenize tne melted material, optionally also followed by anotner metering section which will increase the pumping to a pressure necessary to extrude through the die. The melt is more or less homogenous in temperature and uniformity as it passes through and out of the die forming a molten film. This weo then is drawn down into the nip of the embossing roll and a rubber nip roll as illustrated in FIG. 4. The rubber nip roll forces the molten film into the embossing roll, thus duplicating the surface pattern of the embossing roll. The web is simultaneously cooled by the embossing roll and drawn off onto other take-up rolls. It then proceeds through various treatment stations to a wind-up system where the embossed film can then be wound up.

In the extruder, the resin is subjected to temperatures ranging from about 50° F. above ambient up to 600° F. The extrudate emerges at temperatures from 275° F. to 600° F., preferably from 375° F. to 580° F., under varying conditions of head pressure. Average residence times in the extruder can vary from about 0.5 to 15 minutes. The embossed film is usually formed in a uniform thickness of from about 0.5 to 5.0 mils thick.

FLUID MEDIUM

A variety of fluid mediums can be employed according to the present invention such as nitrogen, carbon dioxide, atomized water spray, or air. Air is the preferred fluid medium. The air can be directed against the moving molten film by a variety of techniques. It is preferred, however, that the air be delivered against the surface of the moving molten film from a slit-like orifice. In general, air can contact the moving molten film at any point between the die and the rapid cooling station. It is preferred that the air contact the molten film at about midway between the die and rapid cooling station, although positioning of the source of air at any point between the die and rapid cooling station is operable. It is preferred to use a fluid medium device which includes a manifold to uniformly distribute the fluid medium and which has a slit running along its length approximately measuring about 1/16 to about ¼ inch wide. The length of the discharge opening of the fluid medium device is preferably at least equal to the width of the molten film emerging from the die. Tne fluid medium device is associated with a source of air which can be supplied by a variety of commercially available devices such as blowers. Merely as illustrative, the following sources of air such as blowers can be utilized according to the present invention:

Dayton Blower, 10⅜" diameter wheel, 4HP
Model: 3N 178E
Address: Dayton Electric Mfg. Co. Chicago, Ill. 60648 or:

New York Blower, 330 cfm @14" H$_2$O, 1½ HP
Model: N14P
Address: New York Blower Co. Willowbrook, Ill.

Reference is now made to the drawing and particularly FIG. 1 which schematically illustrates the process of the invention.

Specifically a molten web or film 10 is shown being extruded from Extruder 12 fed from Hopper 13, through a die 14 in a substantially vertically downward direction where it is qirected into a rapid cooling zone or station 16 containing a cooling roll 18 and a nip roll 22. As will be recognized by those skilled in the art, the molten film can also be extruded in other directions, e.g., horizontal. Details of the upstream apparatus are not given (e.g., the extruder, die, etc.) since conventional process and apparatus may be employed to melt and advance the polymer material to form the molten film or film, such conventional apparatus and process being determined by the resin used and by the end use requirements, of the molten film, e.g., extrusion coating, embossing and the like. Similarly, details of the downstream apparatus (e.g., the cooling means, nip means and take-up of the film) are also dependent on the end use requirements as stated above.

In a broad concept, therefore, two items are required i.e., extrusion die 14 and a rapid cooling zone or station 16 containing nip roll 22 and chilling roll 18 and the conditions of operation are such that polymeric materials which are susceptible to draw resonance will draw resonate at the speeds encountered. Provision for reducing the incidence of draw resonance is provided by directing a fluid medium or stream against the moving molten film at a point between die 14 and nip roll 18 and chilling roll 22. Thus and referring again to FIG. 1, there is provided a fluid medium device, such as an air device 24 which is shown as being positioned intermediate die 14 and cooling station 16 preferably approximately midpoint between die 14 and the rapid cooling zone or station 16.

Figure 2:
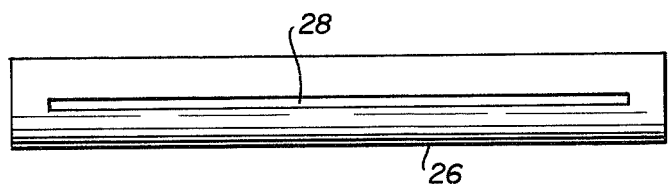
FIG. 2 is a front view of a portion of a typical fluid medium device illustrating the slot for the exiting fluid.
Figure 5:
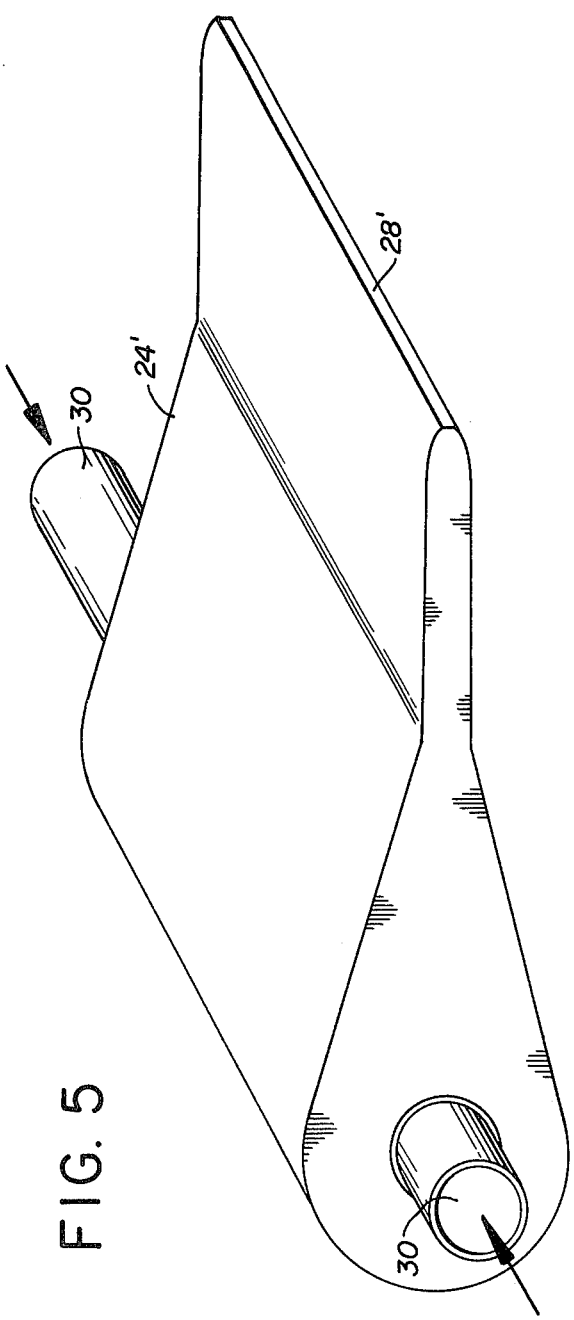
FIG. 5 is a perspective view of an alternate and preferable type fluid medium device which can be used according to the present invention.

The air device is designed so as to emit a stream of air 20 against the surface of the moving molten film. Thus referring to FIG. 2 the stream of air is provided by discharging pressurized air from manifold 26 which extends transversely across the moving film 10 and which is provided with slit or openings 28 through which the air passes. The slit generally extends across the length of the manifold and is preferably equal in length to the width of the molten film emerging from the die. It will of course be understood that a system can be designed in which the length of the slit is less than the width of the molten film but which provides uniform distribution of fluid medium across the width of the molten film. Another preferred fluid medium device design is illustrated in FIG. 5. It is internally baffled (not shown) to provide more uniform air flow distribution from the slit than the device shown in FIG. 2. Thus with reference to FIG. 5 fluid such as air is introduced through air inlets 30 and is discharged through slit 28' of fluid device 24' where it is directed towards the moving film. In both devices, the slit need not be continuous and in fact there can be a series of openings extending across the manifold. Air can be supplied to the manifold by conventional techniques utilizing conventional equipment.

The distance from the molten polymeric film to the fluid medium device is a function of the process conditions and typically can be in a range of from about ¼ to 10 inches and preferably ½ to 1½ inches. Likewise, the velocity of air delivered from the fluid medium device is also a function of the process conditions and can be varied over a range in FPM of about 1 to 150 and preferably about 10 to 50. The air can contact the moving film either perpendicularly or at angles to the film.

The process of the present invention is ideally suited for extrusion coating processes wherein the molten film is normally susceptible to draw resonance. The conditions and equipment for the extrusion coating are conventional. Thus as shown in FIG. 3, wherein like parts are designated by like reference numerals with respect to FIG. 1, resin is fed from the hopper 13 to the extruder 12 and thence to the die 14, molten film 10 is discharged from the die and contacted with the fluid medium 20 from the fluid medium device 24 as explained previously at a point between the die exit and the nip of pressure roll 32 and chill roll 34 in the rapid cooling zone. The molten film is coated onto substrate 36, cooled at the rapid cooling station or zone and then the coated product 38 leaving the rapid cooling zone is collected.

The process of the present invention is also ideally suited for an embossing process wherein film was susceptible to draw resonance under the conditions of operation. The conditions and equipment for the embossing process are conventional. Thus, as shown in FIG. 4, wherein like parts are designated by like reference numerals with respect to FIG. 1, resin is fed from hopper 13 to extruder 12 and thence to the die 14. Molten film 10 is discharged from the die and contacted with fluid stream 20 from the fluid medium device 24 as explained previously at a point between the die exit and the nip of the rubber nip roll 40 and the embossing roll 42 in the rapid cooling zone. The molten film is embossed by the embossing roll 42 in contact with the rubber nip roll 40 and the embossed film is then taken up by the take-up rolls. Rapid cooling of tne molten film is provided by direct contact with the metal embossing roll. Cooling of the rubber roll is provided, by internal cooling and/or the water bath 44 which cools the rubber nip roll 40 during rotation of the rubber nip roll. Wiper roll 46 removes excess water from rubber nip roll 42, and product 48 travels around product roll 50 and thence to storage.

The following Examples will further illustrate the invention.

EXAMPLE I

This Example demonstrates the maximum line speeds attainable in an extrusion coating process before the onset of draw resonance. The results are compared with a conventional procedure without the utilization of a fluid medium device.

The resin employed was GRSN-7042 which is a 2.0 melt index, 0.918 g/cc density low pressure polymerized ethylene copolymer of ethylene and butene-1 and which is commercially available from Union Carbide Corp. Tne resin contained 5 wt. % DFDC-0093, masterbatch, which is also commercially available from Union Carbide Corp.

The extruder utilized was a 2½ inch diameter Royle extruder, having a barrel length to diameter of 27 to 1 and a 24/1 length to diameter (L/D) ratio polyethylene screw.

The extruder had a 50 horsepower Dynamatic drive and 5 barrel heating zones. The die utilized was a 12 inch diameter semi-coathangar type die which was end fed, had a final land length of ¾ inch, and a die gap setting of approximately 20 mils.

The coating unit was an Egan unit having a laminating station 28 inches wide and included a payoff roll, a preheat drum, a chill roll, a rubber nip roll, and a windup roll. Coating thickness was controlled by the line speed of tne coating unit since the extruder output was constant. The substrate was 40 lb. Kraft paper; nip pressure (lbs/linear inch) was 100; chill rolls water temperature was 55° F. and chill water flow was 90 gpm.

The fluid medium device consisted of a 2" diameter tube with ⅛" wide × 12" long slit. Air was supplied by a 1 HP Blower identified as a Dayton Blower 10⅝" diameter wheel, Model 3N 178E available from Dayton Electric Mfg. Co. Chicago, Ill. 60648.

The fluid medium device was positioned approximately 1" below the die (about 5" to the nip point of the coating station). Tne vertical distance from the die to the nip point was about 6 inches and the distance from the molten polymeric film to the fluid medium device was about 1 inch. Air was delivered from the fluid medium device at a range in FPM of 20-30 and the average FPM was 26.

Other operating conditions were as indicated below:

| Operating Conditions | Without Fluid Medium Device | With Fluid Medium Device |
| --- | --- | --- |
| Extruder Screw Speed, RPM | 28 | 28 |
| Die Rate, lbs/hr | 36 | 36 |
| Melt Temperature, °F. | 590 | 590 |
| Head Pressure, psi | 1000 | 1000 |

The extrusion was continued and the maximum line speed attainable before the onset of draw resonance was recorded. Draw resonance was determined by visual observation of the molten film and the extrusion coated product. The results are indicated below:

|  | Without Medium Device | With Fluid Medium Device |
| --- | --- | --- |
| Line Speed, FPM | 200 | 800 |

EXAMPLE II

This Example is similar to Example I and demonstrates the maximum line speeds attainable in an extrusion coating process before the onset of draw resonance. The results are compared with a conventional procedure without the utilization of a fluid medium device.

The resin employed was GRSN-7149 which is a 5.0 melt index, 0.934 g/cc density low pressure polymerized ethylene copolymer of ethylene and which is commercially available from Union Carbide Corp. The resin contained 5 wt. % DFDC-0093 masterbatch which is also commercially available from Union Carbide Corp.

The Extruder, Die and Coating unit was the same as in Example I.

The fluid medium device included a ½" diameter tube with ⅛" wide × 12" long slit. Air was supplied by a 1 HP Blower identified as a Dayton Blower 10⅝" diameter wheel, Model 3N 178E available from Dayton Electric Mfg. Co., Chicago, Ill. 60648.

The fluid medium device was positioned approximately 1" below the die (about 5" above the nip point of the coating station). The vertical distance from the die to the nip point was about 6 inches and the distance from the molten polymeric film to the fluid medium device was about 1 inch. Air was delivered from the fluid medium device at a range in FPM of 2–18 and the average FPM was 5.

Other operating conditions were as indicated below:

| Operating Conditions | Without Fluid Medium Device | With Fluid Medium Device |
| --- | --- | --- |
| Extruder Screw Speed, RPM | 55 | 55 |
| Die Rate, lbs/hr | 71 | 71 |
| Melt Temperature, °F. | 525 | 525 |
| Head Pressure, psi | 1500 | 1500 |

The extrusion was continued and the maximum line speed attainable before the onset of draw resonance was recorded. Draw resonance was determined by visual observation of the molten film and the extrusion coated product. The results are indicated below:

|  | Without Fluid Medium Device | With Fluid Medium Device |
| --- | --- | --- |
| Line Speed, FPM | 300 | 1100 |

EXAMPLE III

This Example is similar to Examples I and II and demonstrates the maximum line speeds attainable in an extrusion coating process before the onset of draw resonance. The results are compared with a conventional procedure without the utilization of a fluid medium device.

The resin employed was DMDJ-7006 which is a 6.0 melt index, 0.960 g/cc density low pressure polymerized ethylene copolymer of ethylene and butene-1 and which can be produced according to U.S. Pat. No. 3,709,853. The resin is commercially available from Union Carbide Corp. The resin contained 5 wt. % DFDC-0093 masterbatch which is also commercially available from Union Carbide Corp.

The Extruder, Die, Blower, Fluid Medium Device and Coating unit was the same as in Example I.

The fluid medium device was positioned approximately midway between the die and the nip point of the coating station. The vertical distance from the die to the nip point was about 5 inches and the distance from the molten polymeric film to the fluid medium device was about 1 inch. Air was delivered from the fluid medium device at a range in FPM of 4–50 and the average FPM was 13.

Other operating conditions were as indicated below:

| Operating Conditions | Without Fluid Medium Device | With Fluid Medium Device |
| --- | --- | --- |
| Extruder Screw Speed, RPM | 28 | 28 |
| Die Rate, lbs/hr | 35.6 | 35.6 |
| Melt Temperature, °F. | 535 | 535 |
| Head Pressure, psi | — | — |

The extrusion was continued and the maximum line speed attainable before the onset of draw resonance was recorded. Draw resonance was determined by visual observation of the molten film and the extrusion coated product. The results are indicated below:

|  | Without Fluid Medium Device | With Fluid Medium Device |
| --- | --- | --- |
| Line Speed, FPM | 150 | 300 |

EXAMPLE IV

This Example further demonstrates the maximum line speeds attainable in an extrusion coating process before the onset of draw resonance. The results are compared with a conventional procedure without the utilization of a fluid medium device.

The resin employed was NORCHEM NPP 1001 LP which is a 1.2 melt flow rate, 0.906 g/cc density propylene homopolymer and which is commercially available from Northern Petrochemical Co., Des Plaines, Ill.

The Extruder, Die Coating Unit and Fluid Medium Device was as in Example I.

The fluid medium device was positioned approximately 1 inch below the die (5" above the nip point of the coating station). The vertical distance from the die to the nip point was about 6 inches and the distance from the molten polymeric film to the fluid medium device was about 1 inch. Air was delivered from the fluid medium device at a range in FPM of 4–50 and the average FPM was 13.

Other operating conditions were as indicated below:

| Operating Conditions | Without Fluid Medium Device | With Fluid Medium Device |
| --- | --- | --- |
| Extruder Screw Speed, RPM | 36 | 36 |
| Die Rate, lbs/hr | 34 | 34 |
| Melt Temperature, °F. | 540 | 540 |
| Head Pressure, psi | 700 | 700 |

The extrusion was continued and the maximum line speed attainable before the onset of draw resonance was recorded. Draw resonance was determined by visual observation of the molten film and the extrusion coated product. The results are

| | Without Fluid Medium Device | With Fluid Medium Device |
| --- | --- | --- |
| Line Speed, FPM | 150 | 250 |

EXAMPLE V

This Example is similar to the previous examples and demonstrates the maximum line speeds attainable in an extrusion coating process before the onset of draw resonance. The results are compared with a conventional procedure without the utilization of a fluid medium device.

The resin employed was DFDB-0332, a Tubular high pressure low density polyethylene (HP-LDPE) which is a 2.0 melt index, 0.924 g/cc density homopolymer and which is commercially available from Union Carbide Corp.

The Extruder, Die, Coating Unit and Fluid Medium device was as in Example I.

The fluid medium device was positioned approximately midway between the die and the nip point of the coating station. The vertical distance from the die to the nip point was about 4 inches and the distance from the molten polymeric film to the fluid medium device was about 1 inch. Air was delivered from the fluid medium device at a range in FPM of 1–14 and the average FPM was 3.

Other operating conditions were as indicated below:

| Operating Conditions | Without Fluid Medium Device | With Fluid Medium Device |
| --- | --- | --- |
| Extruder Screw Speed, RPM | 55 | 55 |
| Die Rate, lbs/hr | 65 | 65 |
| Melt Temperature, °F. | 580 | 580 |
| Head Pressure, psi | 650 | 650 |

The extrusion was continued and the maximum line speed attainable before the onset of draw resonance was recorded. Draw resonance was determined by visual observation of the molten film and the extrusion coated product. The results are indicated below:

| | Without Fluid Medium Device | With Fluid Medium Device |
| --- | --- | --- |
| Line Speed, FPM | 200 | 1200 |

The line was voluntarily shut down at 1200 FPM since no draw resonance was observed up to this rate.

EXAMPLE VI

This Example demonstrates the use of an atomized water spray as the fluid medium to reduce draw resonance in molten films fabricated from a linear low pressure low density resin. The resin employed was GRSN-7042. The resin contained 5 wt. % DFDC-0093 masterbatch which is also commercially available from Union Carbide Corp.

The equipment and general conditions utilized were as in Example I except as otherwise indicated below. The fluid medium device was an air atomizing water spray nozzle with siphon set-up available from Robert Miller Associates, Spraying System Co., Model ¼ JNF 1. Air supply was delivered at 15 psi. The water spray was directed at the molten film approximately midway between the die and the nip point.

| Operating Conditions | Without Fluid Medium Device | With Fluid Medium Device |
| --- | --- | --- |
| Extruder Screw Speed, RPM | 28 | 28 |
| Die Rate, lbs/hr | 36 | 36 |
| Melt Temperature, °F. | 535 | 535 |
| Head Pressure, psi | 1400 | 1400 |
| Draw Span, in. [a] | 6 | 6 |

The extrusion was continued and the maximum line speed attainable before the onset of draw resonance was recorded. Draw resonance was determined by visual observation of the molten film and the resulting film product. The results are indicated below:

| | Without Fluid Medium Device | With Fluid Medium Device |
| --- | --- | --- |
| Line Speed, FPM | 200 | 500 |

EXAMPLE VII

This Example demonstrates the maximum line speeds attainable in a melt embossing process before the onset of draw resonance. The results are compared with a conventional procedure without the utilization of a fluid medium device.

The resin employed was GRSN-7042 which is a 2.0 melt index, 0.918 g/cc density low pressure polymerized ethylene copolymer of ethylene which is commercially available from Union Carbide Corp. The resin contained 5 wt. % of DFDC-0093 masterbatch which is also commercially available from Union Carbide Corp.

The extruder utilized was a 2½ inch diameter Egan extruder, having a barrel length to diameter of 28 to 1 and a 28 to 1 length to diameter (L/D) ratio polyethylene screw.

The extruder had a 75 horsepower Dynamic drive and 5 barrel heating zones. The die utilized was a 48 inch Black Clawson die deckled to a 30" width. The die which was center fed had a final land length of 1 inch, and a die gap setting of approximately 40 mils.

The Embossing unit (see FIG. 4) consisted of a 24″, chrome-plated embossing roll and a 12 inch silicone rubber (55 Shore A hardness) nip roll that forced the molten polymer against the casting roll. The embossing roll temperature was about 70° F. and was maintained by a water flow in the roll of 150 gpm. The rubber roll was cooled in a water bath maintained at 70°–80° F. A 4 inch diameter steel wiper roll was used to remove excess water from the rubber roll. The secondary chrome-plated cooling roll (12″ diameter) and the balance of the take-off and wind-up equipment were part of an Egan slot cast unit.

The fluid medium device consisted of a 2″ diameter tube with ¼″ wide × 30″ long slit. Air was supplied by a 1½ HP Blower identified as a N.Y. Blower, Model N14P available from The New York Blower Co., Willowbrook, Ill.

The fluid medium device was positioned approximately midway between the die and the nip point of the embossing station. The distance from the die exit to the nip point in the embossing station was about 7.5 inches and the distance from the molten polymeric film to the fluid medium device was about 1½ inches. Air was delivered from the fluid medium device at a range in FPM of 32–110 and the average FPM was 61.

Other operating conditions were as indicated below:

| Operating Conditions | Without Fluid Medium Device | With Fluid Medium Device |
| --- | --- | --- |
| Extruder Screw Speed, RPM | 175 | 175 |
| Die Rate, lbs/hr | 320 | 320 |
| Melt Temperature, °F. | 535 | 535 |
| Head Pressure, psi | 2700 | 2700 |

The extrusion was continued and the maximum line speed attainable before the onset of draw resonance was recorded. Draw resonance was determined by visual observation of the molten film and the resulting film product. The results are indicated below:

|  | Without Fluid Medium Device | With Fluid Medium Device |
| --- | --- | --- |
| Line Speed, FPM | 200 | 500 |
| Film width (in.) | 21.5 | 21 |
| Gauge, (mils) | 2.0 | 0.8 |

EXAMPLE VIII

This Example is similar to Example VII and demonstrates the maximum line speeds attainable in a melt embossing extrusion process before the onset of draw resonance. The results are compared with a conventional procedure without the utilization of a fluid medium device.

The resin employed was GRSN-7047 which is a 1.0 melt index, 0.918 g/cc density low pressure polymerized ethylene copolymer of ethylene and butene-1 and which is commercially available from Union Carbide Corp. The resin contained 5 wt. % DFDC-0093 masterbatch which is also commercially available from Union Carbide Corp.

The Extruder, Die, Embossing Unit and Fluid Medium device and operating conditions were the same as in Example VII except as hereafter set forth.

The fluid medium device was positioned approximately 3 inches below the die (8¾ inches above the nip point of the embossing station). The distance from the die exit to the nip point was about 11¾ inches and the distance from the molten polymeric film to the fluid medium device was about 1½ inches. Air was delivered from the fluid medium device at a range in FPM of 32–110 and the average FPM was 61.

Other operating conditions were as indicated below:

| Operating Conditions | Without Fluid Medium Device | With Fluid Medium Device |
| --- | --- | --- |
| Extruder Screw Speed, RPM | 175 | 175 |
| Die Rate, lbs/hr | 320 | 320 |
| Melt Temperature, °F. | 575 | 575 |
| Head Pressure, psi | 3200 | 3200 |

The extrusion was continued and the maximum line speed attainable before the onset of draw resonance was recorded. Draw resonance was determined by visual observation of the molten film and the embossed product. The results are indicated below:

|  | Without Fluid Medium Device | With Fluid Medium Device |
| --- | --- | --- |
| Line Speed, FPM | 150 | 400 |
| Film width (in.) | 21 | 18 |
| Gauge, (mils) | 2.2 | 1.1 |

EXAMPLE IX

This Example demonstrates a reduction of draw resonance in molten films fabricated from a mixture of linear low pressure low density resins and high pressure resins. The resins employed were a mixture of 76 wt. % GRSN-7042 and 20 wt. % DFDB-2055 which is a 1.5 melt index, 0.0923 density high pressure polymerized ethylene polymer available from Union Carbide Corp. The resin also contained 4 wt % DFDC-0093 masterbatch which is also commercially available from Union Carbide Corp.

The equipment and general conditions utilized were as in Example VII. Other operating conditions are as indicated below:

| Operating Conditions | Without Fluid Medium Device | With Fluid Medium Device |
| --- | --- | --- |
| Extruder Screw Speed, RPM | 175 | 175 |
| Die Rate, lbs/hr | 315 | 315 |
| Melt Temperature, °F. | 515 | 515 |
| Head Pressure, psi | 2600 | 2600 |
| Draw Span, in. [a] | 8 | 8 |

[a] Distance between die exit and nip point in the embossing station.

The extrusion was continued and the maximum line speed attainable before the onset of draw resonance was recorded. Draw resonance was determined by visual observation of the molten film and the resulting film product. The results are indicated below:

|  | Without Fluid Medium Device | With Fluid Medium Device |
| --- | --- | --- |
| Line Speed, FPM | 300 | 550 |
| Film width (in) | 22 | 21.4 |
| Gauge, (mils) | 1.5 | 0.85 |

EXAMPLE X

This Example is similar to Example VII and demonstrates the effect a higher volume of air to the fluid medium device has on the maximum line speed attainable in a melt embossing extrusion process before the onset of draw resonance.

The resin employed was GRSN-7042 which is a 2.0 melt index, 0.918 density low pressure polymerized ethylene copolymer of ethylene and butene-1 and which is commercially available from Union Carbide Corp. The resin contained 5 wt. % DFDC-0093 masterbatch which is also commercially available from Union Carbide Corp.

The Extruder, Die and Embossing unit and operating conditions were the same as in Example VII except as hereafter set forth. The fluid medium device used is illustrated in FIG. 5. Air to the fluid medium device was supplied by the 1½ HP blower identified in Example VII.

The fluid medium device was positioned approximately 3½ inches below the die (4 inches above the nip point of the embossing station). The distance from the die exit to the nip point was about 7½ inches and the distance from the molten polymeric film or web to the fluid medium device was about ¾ inches. Air was delivered to the fluid medium from the blower at the pressures, measured in inches of $H_2O$ by a Magnahelic pressure gauge.

Other operating conditions were as indicated below:

| Operating Conditions | Fluid Medium Device 10 in. $H_2O$* | Fluid Medium Device 13 in. $H_2O$* |
|---|---|---|
| Extruder Screw Speed, RPM | 175 | 175 |
| Die Rate, lbs/hr | 320 | 320 |
| Melt Temperature, °F. | 535 | 535 |
| Head Pressure, psi | 2700 | 2700 |

*Blower pressure measured on inlet to fluid medium device

The extrusion was continued with the maximum line speed attainable before the onset of draw resonance was recorded. Draw resonance was determined by visual observation of the molten film and the embossed product. The results are indicated below:

|  | Fluid Medium Device 10 in. $H_2O$ | Fluid Medium Device 13 in. $H_2O$ |
|---|---|---|
| Line Speed, FPM | 450 | 650 |
| Film Width, in. | 21.3 | 20.8 |
| Gauge, mils. | 1.1 | 0.8 |

*Blower pressure measured on inlet to fluid medium device.

EXAMPLE XI

This Example demonstrates the use of a tubular roll made of porous metal as the fluid medium device to reduce draw resonance in molten films fabricated from a linear low pressure low density resin. The resin employed was GRSN-7042. The resin contained 5 wt. % DFDC-0093 masterbatch which is also commercially available from Union Carbide Corp.

The equipment and general conditions utilized were as in Example VII except as otherwise indicated below. The fluid medium device was a tubular roll available from Mott Metallurgical Corp. Farmington, CT. Catalog No. 3120. Air supply was delivered as 12.5 psi. The center line of the air film roll was positioned about 4 inches below the die (5¾ inches above the nip point of the embossing station). The distance from the die exit to the nip point was about 9¾ inches. The molten film was drawn vertically down so that it just contacted the air film roll on approximately 20% of its surface.

Other operating conditions were also indicated below:

| Operating Conditions | Without Fluid Medium Device | With Fluid Medium Device* |
|---|---|---|
| Extruder Screw Speed, RPM | 140 | 140 |
| Die Rate, lbs/hr | 235 | 235 |
| Melt Temperature, °F. | 525 | 525 |
| Head Pressure, psi | 2350 | 2350 |

*Fluid medium device was a tubular roll described above.

The extrusion was continued and the maximum line speed attainable before the onset of draw resonance was recorded. Draw resonance was determined by visual observation of the molten film and the embossed product. The results are indicated below:

|  | Without Fluid Medium Device | With Fluid Medium Device |
|---|---|---|
| Line Speed, FPM | 150 | 400 |
| Film width (in.) | 21.5 | 20.3 |
| Gauge, (mils) | 2.0 | 1.3 |

The tubular roll was not as effective as the fluid medium device shown in FIG. 5, but it is much smaller and may be useful in situations where the available space is limited.

What is claimed is:

1. A process for reducing draw resonance of a polyolefin molten film susceptible to draw resonance under conditions which would cause draw resonance by extruding the molten film from a die and rapidly cooling said molten film in a rapid cooling zone containing a pressure roll and chilling roll, which comprises contacting said molten film transversely across the surface of said molten film with a gas selected from nitrogen, carbon dioxide, or air at a site substantially midway between said die and the nip of said pressure roll and chilling roll said gas being directed against said molten film at a velocity of about 1 to 150 feet per minute and in an amount sufficient to reduce draw resonance in said molten film. pg,39

2. A process according to claim 1 wherein said gas discharged from a slit-like orifice.

3. A process according to claim 1 wherein said gas contacts said molten film angularly with respect to the film travel direction.

4. A process according to claim 1 wherein said gas contacts said molten film at an angle of about 90° with respect to the film travel direction.

5. A process according to claim 1 wherein the velocity of said gas is about 10 to 15 feet per minute.

6. A process according to claim 1 wherein said gas is directed from a source positioned about ¼ to about 10 inches from the surface of the moving film.

7. A process according to claim 1 wherein said gas is directed from a source positioned about ½ to about 1½ inches from the surface of the moving film.

8. A process according to claim 7 wherein said polyolefin film is a linear, low density ethylene hydrocarbon copolymer.

9. An improvement in an extrusion coating process wherein a polymeric resin is extruded through an extrusion die to form a molten film and wherein said molten film is drawn down, coated onto a substrate and cooled in a rapid cooling zone containing a pressure roll and a chilling roll, the improvement comprising directing a gas selected from nitrogen, carbon dioxide, and air against said molten film between said die and the nip of said pressure roll and chilling roll said gas being directed against said molten film at a velocity and in an amount sufficient to reduce draw resonance in said molten film.

10. The improvement according to claim 9 wherein said gas is air.

11. The improvement according to claim 9 wherein said gas contacts said molten film transversely across the surface of said molten film.

12. The improvement according to claim 9 wherein said gas is discharged from a slit-like orifice.

13. The improvement according to claim 9 wherein said gas contacts said molten film angularly with respect to the film travel direction.

14. The improvement according to claim 9 wherein said gas contacts said molten film at an angle of about 90° with respect to the film travel direction.

15. The improvement according to claim 9 wherein the velocity of said gas is about 1 to about 150 feet per minute.

16. The improvement according to claim 9 wherein the velocity of said gas is about 10 to 15 feet per minute.

17. The improvement according to claim 9 wherein said gas is directed from a source positioned about ¼ to about 10 inches from the surface of the moving film.

18. The improvement according to claim 9 wherein said gas is directed from a source positioned about ½ inch to about 1½ inches from the surface of the moving film.

19. The improvement according to claim 9 wherein said polymeric film is a polyolefin film.

20. The improvement according to claim 9 wherein said polyolefin film is a linear, low density ethylene hydrocarbon copolymer.

21. The improvement according to claim 9 wnerein said gas contacts moving film at a site substantially midway between said die and said rapid cooling zone.

22. An improvement in an embossing process wherein a polymeric resin is extruded through an extrusion die to form a molten film and wherein said molten film is drawn down and embossed in a rapid cooling zone containing a pressure roll and a chilling roll, the improvement comprising directing a gas selected from nitrogen, carbon dioxide and air against said molten film between said die and the nip of said pressure roll and chilling roll, said gas being directed against said molten film at a velocity and in an amount sufficient to reduce draw resonance in said molten film.

23. The improvement according to claim 22 wherein said gas is air.

24. The improvement according to claim 22 wherein said gas contacts said molten film transversely across the surface of said molten film.

25. The improvement according to claim 22 wherein said gas is discharged from a slit-like orifice.

26. The improvement according to claim 22 wherein said gas contacts said molten film angularly with respect to the film travel direction.

27. The improvement according to claim 22 wherein said gas contacts said molten film at an angle of about 90° with respect to the film travel direction.

28. The improvement according to claim 22 wherein the velocity of said gas is about 1 to 150 feet per minute.

29. Tne improvement according to claim 22 wherein the velocity of said gas is about 10 to 15 feet per minute.

30. The improvement according to claim 22 wherein said gas is directed from a source positioned about ¼ to about 10 inches from the surface of the moving film.

31. The improvement according to claim 22 wherein said gas is directed from a source positioned about ½ to about 1½ inches from the surface of moving film.

32. The improvement according to claim 22 wherein said polymeric film is a polyolefin film.

33. The improvement according to claim 32 wherein said polyolefin film is a linear, low density ethylene hydrocarbon copolymer.

34. The improvement according to claim 22 wherein said gas contacts said moving film at a site substantially midway between said die and said rapid cooling zone.

* * * * *

UNITED STATES PATENT AND TRADEMARK OFFICE
CERTIFICATE OF CORRECTION

PATENT NO. : 4,486,377
DATED : December 4, 1984
INVENTOR(S) : P.J. Lucchesi et al It is certified that error appears in the above-identified patent and that said Letters Patent is hereby corrected as shown below:

Col 18, claim 1, line 52 at the end of the line, delete "pg,39".

*Signed and Sealed this*

*Twenty-fifth* Day of *June 1985*

[SEAL]

*Attest:*

DONALD J. QUIGG

*Attesting Officer*  *Acting Commissioner of Patents and Trademarks*